United States Patent
Toreklsson et al.

(10) Patent No.: US 6,562,095 B1
(45) Date of Patent: May 13, 2003

(54) FILTERING APPARATUS FOR AIR TREATMENT APPARATUS

(75) Inventors: Stig Toreklsson, Bankeryd (SE); Lars Johnsson, Jönköping (SE); Peder Evers, Jönköping (SE)

(73) Assignee: ABB Flakt AB, Stockholm (SE)

( * ) Notice: Subject to any disclaimer, the term of this patent is extended or adjusted under 35 U.S.C. 154(b) by 0 days.

(21) Appl. No.: 09/807,717

(22) PCT Filed: Oct. 19, 1999

(86) PCT No.: PCT/SE99/01874

§ 371 (c)(1),
(2), (4) Date: Apr. 17, 2001

(87) PCT Pub. No.: WO00/23170

PCT Pub. Date: Apr. 27, 2000

(30) Foreign Application Priority Data

Oct. 22, 1998 (SE) .............................................. 9803626

(51) Int. Cl.[7] .......................... B01D 35/30; B01D 46/00
(52) U.S. Cl. ............................. 55/483; 55/484; 55/502; 55/503; 55/511; 55/DIG. 31
(58) Field of Search ........................ 55/483, 484, 490, 55/495, 501, 502, 503, 511, DIG. 31

(56) References Cited

U.S. PATENT DOCUMENTS

| | | | | |
|---|---|---|---|---|
| 3,247,652 A | * | 4/1966 | Annas et al. .................. | 55/484 |
| 3,552,104 A | * | 1/1971 | Wood .......................... | 55/502 |
| 4,233,044 A | * | 11/1980 | Allan .......................... | 55/502 |
| 4,883,510 A | * | 11/1989 | Giusti et al. .................. | 55/326 |
| 5,443,625 A | | 8/1995 | Schaffhausen | |
| 5,601,626 A | * | 2/1997 | Hori et al. ..................... | 55/483 |
| 6,162,270 A | * | 12/2000 | Nystrom et al. ............... | 55/483 |
| 6,328,777 B1 | * | 12/2001 | Benthaus et al. .............. | 55/483 |
| 6,348,085 B1 | * | 2/2002 | Tokar et al. ................... | 55/502 |
| 6,361,577 B1 | * | 3/2002 | Unrath et al. .......... | 55/DIG. 31 |

FOREIGN PATENT DOCUMENTS

| | | |
|---|---|---|
| EP | 0798027 A1 | 10/1997 |
| EP | 0834706 A1 | 4/1998 |

* cited by examiner

Primary Examiner—Duane Smith
Assistant Examiner—Jason M. Greene
(74) Attorney, Agent, or Firm—Davis & Bujold, P.L.L.C.

(57) ABSTRACT

A filtering apparatus for an air treatment apparatus (5), a superior purity of the filtered air being required. The apparatus has a plurality of filter cartridges (3), provided with filters (2) and inserted into one cassette (4) each. The cassettes are fastened in the air treatment apparatus and the filter cartridges (3) have, on their side, which is turned towards the incoming air stream, a seal (6), which extends in an axial direction and around the periphery and axially abuts a surface, which is oriented radially in relation to the air stream and the apparatus or the like respectively and which surrounds an outlet opening (9), defined by each filter cartridge. According to the invention the surface has a sealing sheet (21), which with the exception of the opening and openings (9) respectively is disposed in a continuous radial sealing cross section-plane through the entire air treatment apparatus or the like (5) and extends outwards in a radial direction through the outer wall (10) of the apparatus at a joint (23).

19 Claims, 4 Drawing Sheets

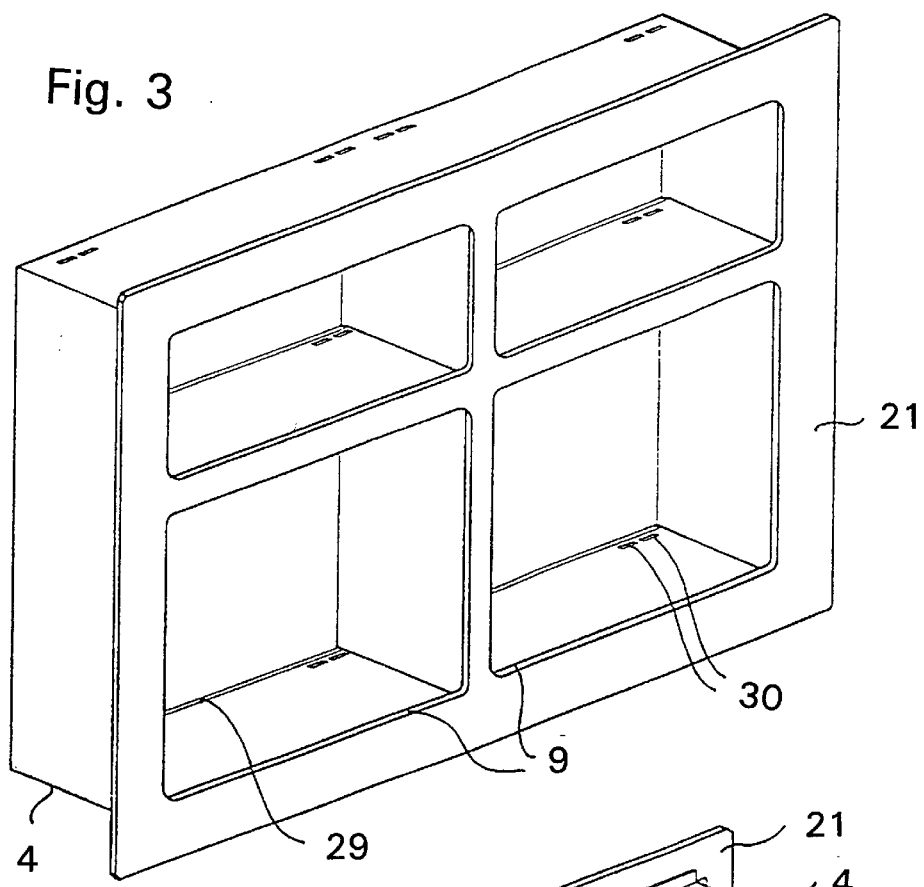
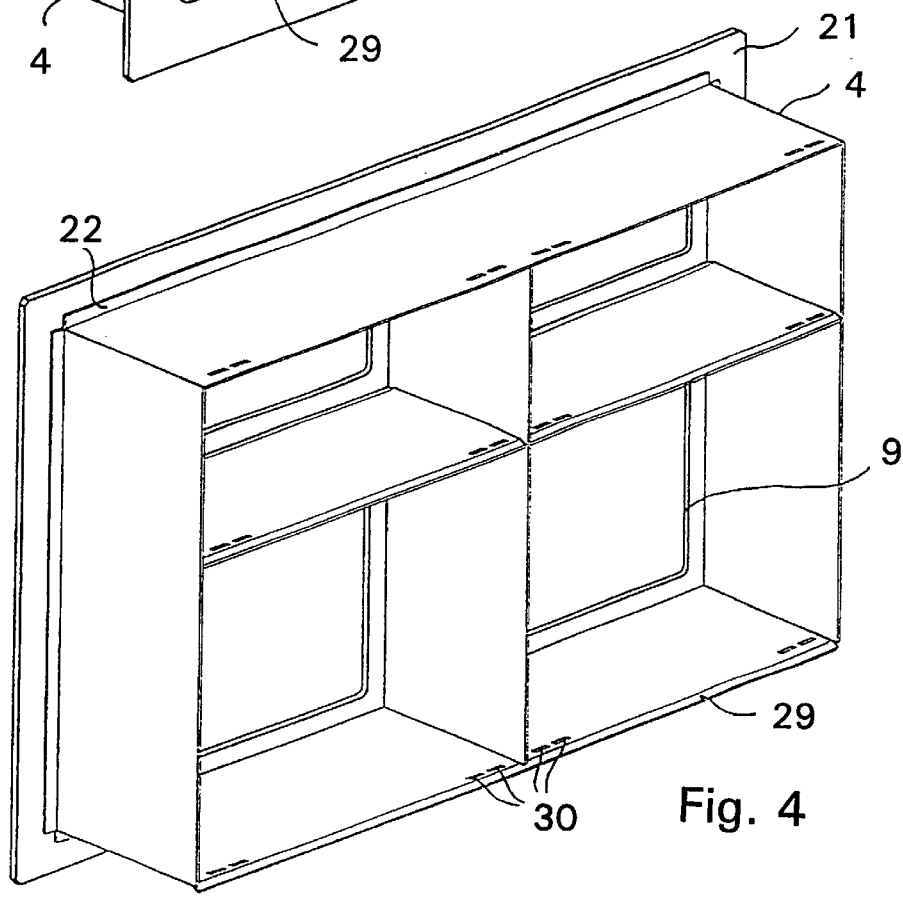

Fig. 5
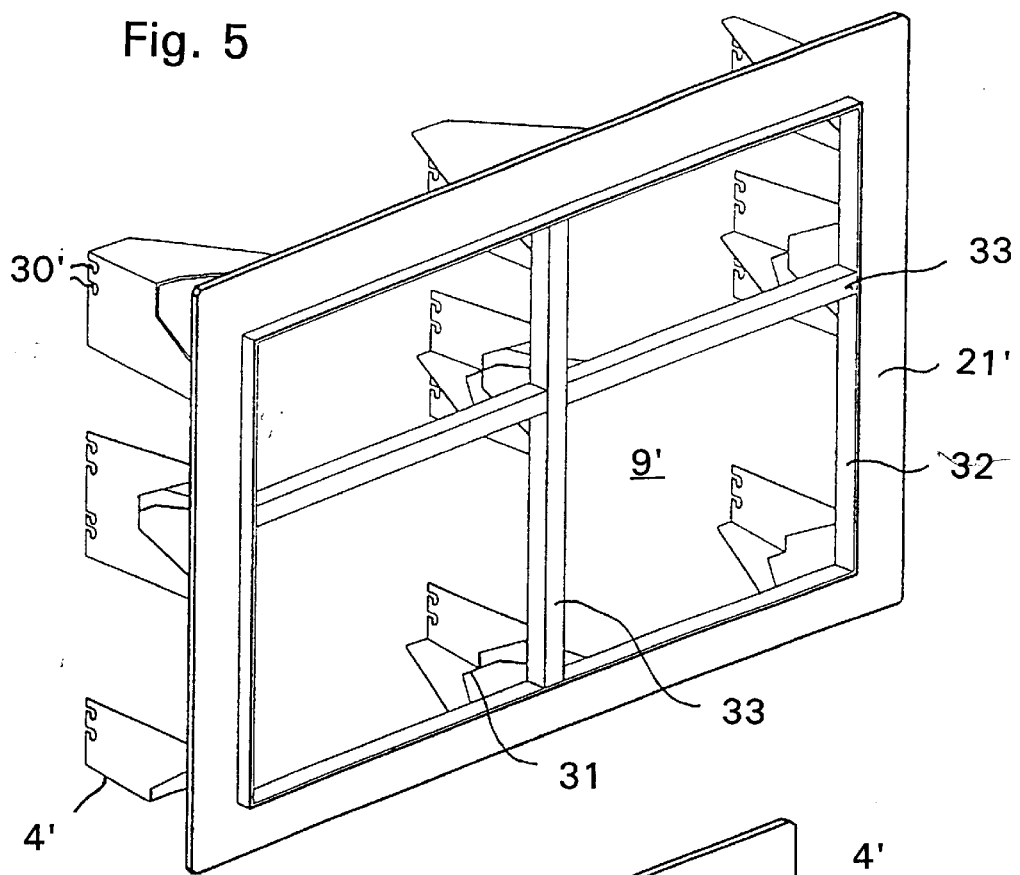
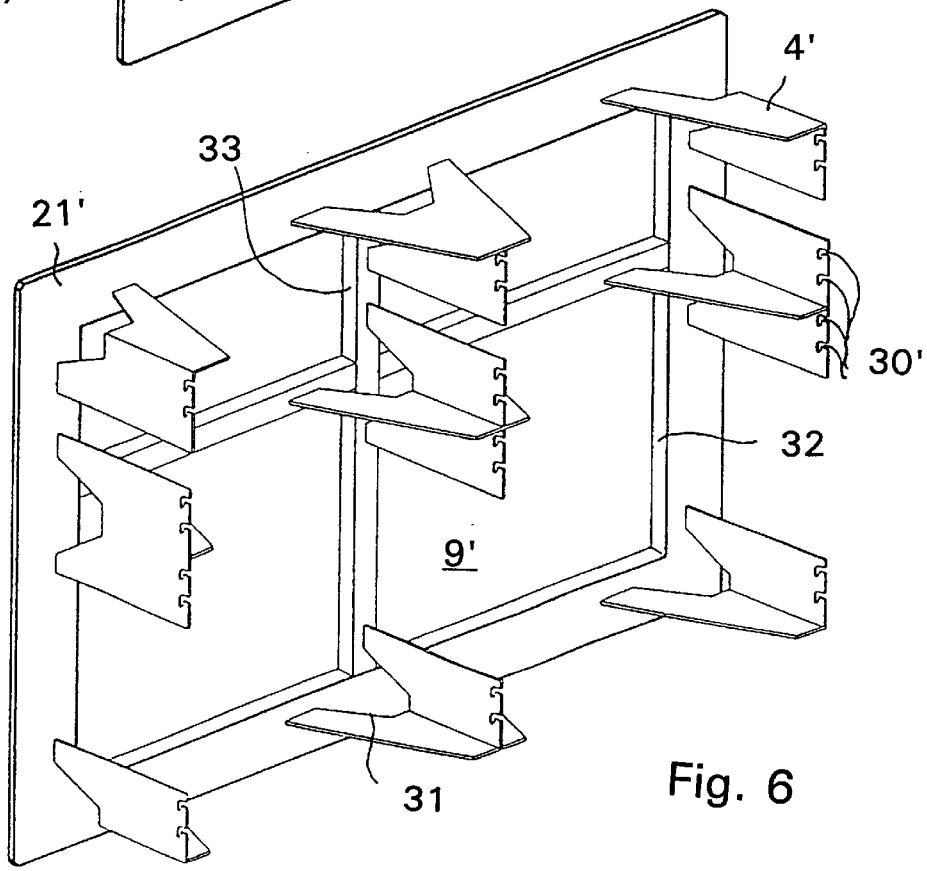
Fig. 6

FILTERING APPARATUS FOR AIR TREATMENT APPARATUS

FIELD OF THE INVENTION

The present invention relates to a filtering apparatus for an air treatment apparatus.

BACKGROUND OF THE INVENTION

Air filters having very high separation percentages (HEPA, ULPA) require, that the integration into the air treatment apparatus or the duct system be of a very high quality. Not desirable air streams, so called by-pass streams, which can pass through the filtering apparatus without being purified, must be reduced as much as possible. Otherwise the filtering function will be inferior despite the fact, that the filter blanks being used have a very advanced quality.

Typical such by-pass paths exist usually between several filter cartridges, which are disposed in a transverse direction in relation to an air stream to be purified, and/or between such filter cartridges and surrounding duct walls and/or via the housing, which often is a double-walled construction, e.g. in an air treatment apparatus.

The foremost reason for this not desirable by-pass leakage is the relatively large decrease in pressure, which is caused by the air passage through the filter cartridges.

The filter cartridges normally comprise folded filter paper with separators, enclosed in a housing made of steal sheet or wood. The dimensions are normally those of an entire module (about 0.6×0.6 m) or a semi-module. Along the periphery of the housing on the air downstream side, which is the "purified" side, there is a seal. The tightness is obtained, because the seal of the filter module is pressed against a plane surface in the form of a flange construction in the duct or an surrounding filter box. This is shown in FIG. 1, which also shows, that the above-mentioned by-pass paths remain despite an adequate sealing within the area of said seal.

In certain cases relatively small filter boxes are used, which are connected to an air duct and in which one or two filter cartridges are enclosed. In case just one filter cartridge is used, the tightness problem can be solved by welding a counter flange to the inner side of the box. However, in case several filter cartridges are used, they and the cassettes, which enclose them, respectively must be sealed against each other and/or against the wall of the box. However, such solutions are time-consuming and often expensive and do not always allow a desirable flexibility, when exchanges are carried out.

When filter cartridges are enclosed in air treatment assemblies, a complicated and expensive duct system is avoided, but on the other hand the tightness problems, mentioned above, arise in a plurality of possible places.

The conventional way of enclosing filter modules in air treatment assemblies comprises the step of joining the filter modules, disposed in their sheet cassettes, to a continuous package. In order to meet the tightness requirements every sheet cassette must be sealed with a sealant all around as well as against the inner sides of the assembly. This sealing is a very delicate and time-consuming process, which means, that a secondary sealing always is recommended on the installation site in connection with the starting of the apparatus. The movements of the housing, e.g. due to pressure differences in the assembly, means, that the sealant must have such properties and be applied in such a way, that it is able to absorb movements without loosing its sealing function.

SUMMARY OF THE INVENTION

The object of the present invention is to provide a new filter apparatus, which eliminates the above-mentioned drawbacks and which also in other respects further develops the state of the art in this field.

BRIEF DESCRIPTION OF THE DRAWINGS

Additional features and advantages of the invention are set forth in the following description, reference being made to the enclosed drawings, which show a few preferred but not limiting embodiments. In the drawings:

FIGS. 3 and 4 are perspective views from the front and from the rear respectively of a typical combination of filter cartridges in an apparatus according to the invention; and FIGS. 5 and 6 are views, which correspond to FIGS. 3 and 4, of a modified embodiment according to the invention.

DETAILED DESCRIPTION OF THE INVENTION

Figure 1:
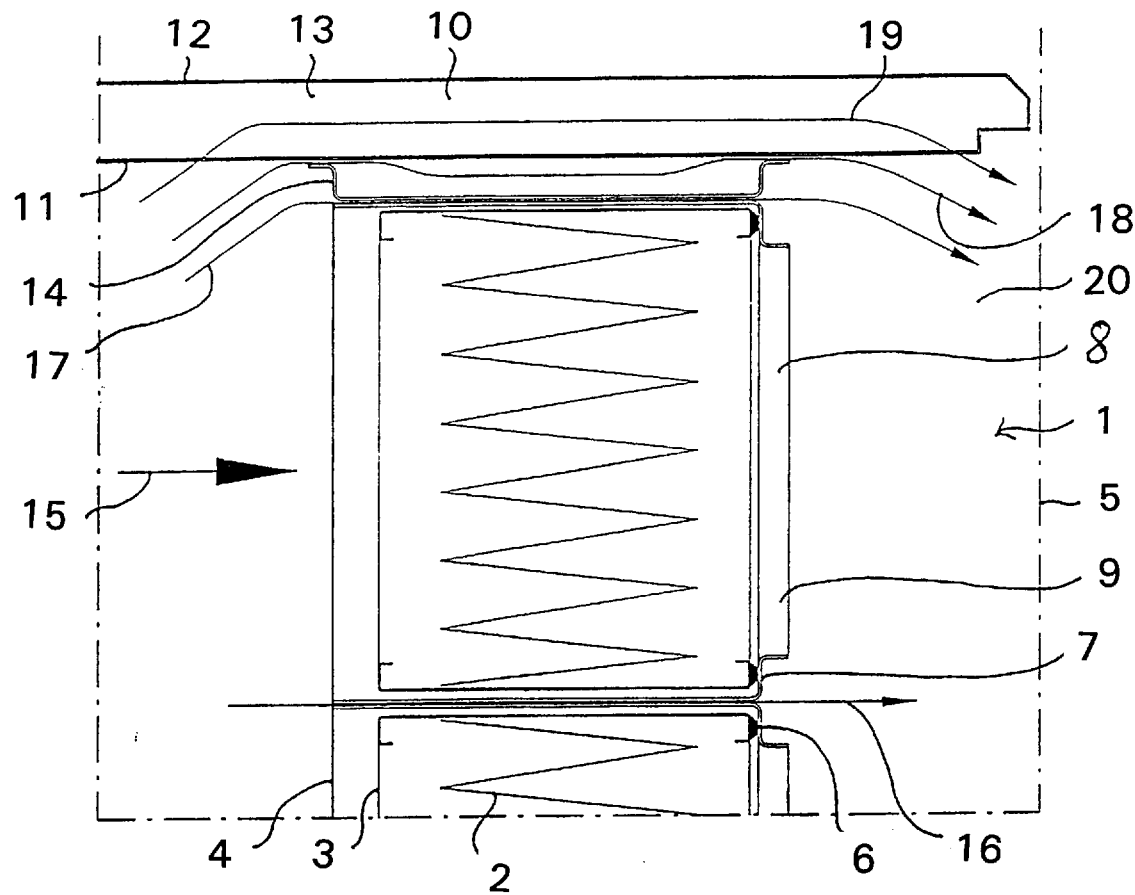
FIG. 1 is a vertical or horizontal sectional view of a portion of an air treatment apparatus having filter cartridges, enclosed in a conventional way.

In FIG. 1 a conventional apparatus 1 is shown, which comprises filters 2 in filter cartridges 3, which in their turn are inserted in cassettes 4, which in their turn are joined to a unit, inserted in an air treatment assembly 5. Filter cartridges 3 with filters 2 are standard components and have on one side, namely the side located downstream, an axially aligned seat 6 around the periphery, which in an axial alignment abuts a radial inner flange 7 around the cassette, to the inner end of which all around an axially aligned flange 8 is connected, which encircles an outlet opening 9.

Air treatment assembly 5 has outer walls 10, which e.g. comprise panels, which consist of inner sheets 11 and outer sheets 12 with an interior 13 between said sheets, which is empty or filled with an insulating material. Filling profiles 14, which in cross section look like handles, project towards the adjacent cassette walls and are fastened to inner sheet 11 and have the same length axially as the cassettes and are designed to fill up the cross section of the duct.

It is shown in FIG. 1, that air 15, which has not been purified and flows into the assembly, can pass through filter 2 and to the lee-side 20 as leakage streams 16 between adjacent cassettes, as leakage streams 17 between the cassettes and filling profiles 14, as leakage streams 18 between the filling profiles and inner sheet 11 as well as as leakage streams 19 through interior 13 between the assembly walls.

Each one of these possible leakage streams are objectionable and jeopardizes the security, e.g. in operation rooms, hospitals, laboratories, research institutions etc.

Figure 2:
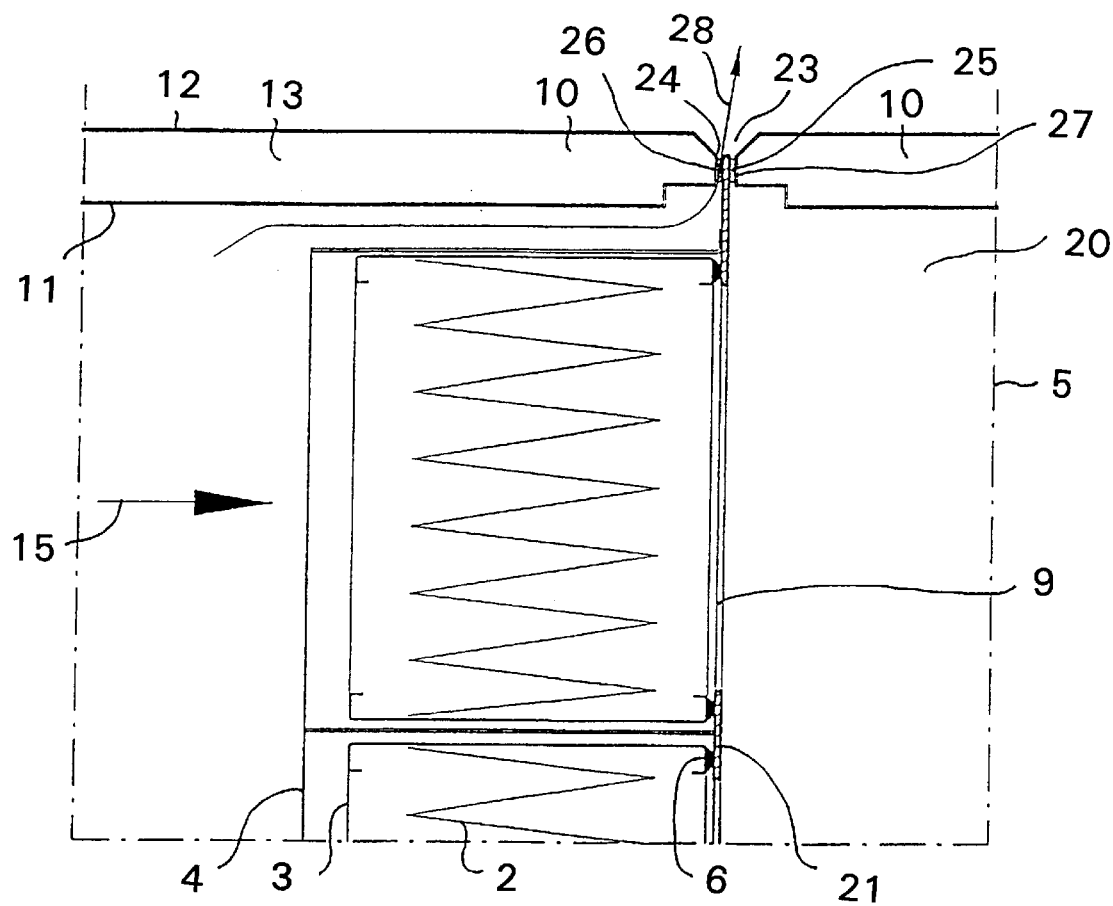
FIG. 2 is a corresponding view of an apparatus according to the invention.

To solve these problems the present invention provides a device 21, which radically reduces the risk of air leakage past an assembly housing or a duct designed in another way. Such a device consists of or comprises a plane sealing sheet, which preferably is most shape resistant due to the selection of a suitable material and/or the thickness of the sheet, to which sealing sheet preferably but not necessarily the adjacent cassette side or the adjacent cassette sides is (are) fastened, e.g. welded, with its (their) main surface on the air supply side, which for this purpose at least partly can have flanges 22, bent outwards from the cassette with an angle of 90°. However, these flanges are not particularly important, and it is shown in FIG. 2, that they are not present at all, in case two cassettes abut each other, in which case available spaces can be maximally utilized and means and costs can be saved and kept low respectively. Thus, within these areas only seals 6 will seal and this is possible, because the seals axially abut sealing sheet 21, which in its turn is designed to completely seal against the lee-side, because the sealing sheet according to an additional very important feature according to the invention is to extend through at least a portion of the assembly wall and preferably reach the atmosphere outside the assembly. This preferably is accomplished within the area of a joint 23 between adjacent assembly panels 10, which joint suitably is sealed by means of seals 24 and 25 between on one hand the sealing sheet and on the other hand panel joint sides 26 and 27, exposed to the sealing sheet Whereas seals 6 act and are influenced in an axial direction and due to the positive influence of the incoming air on the sealing force rather will have a larger sealing effect, because the air pressure differences will increase, the incoming air does not, irrespective of air pressure differences, improve the sealing of seal 24 on the side of the incoming air, and thus a leakage stream 28 may arise in this area, which however due to device 21 reaches the atmosphere outside the assembly, not being able to contaminate the air on the lee-side. The efficiency reduction of the assembly or the duct due to leakage stream 28 usually is completely negligible. Exactly because leakage stream 28 is not important for the intended function of the device, it is possible to not extend sealing sheet 21 through the entire outer wall 10 but fasten it somewhere inside the outer wall, provided a possible leakage stream 28 does not penetrate into the lee-side and is mixed with the filtered air. It is of course the simplest, the best and the most secure thing to do to extend the sealing sheet all the way through outer wall 10 and a joint between adjacent outer wall portions respectively, a guarantee being obtained, that no leakage stream of any kind may reach the filtered purified air.

The free edge area 29 of e.g. the lower cassette sides can be bent outwards in order to facilitate the insertion of the filter cartridges. Also, within e.g. the free end area of the upper and lower sides of the cassettes there may be openings or the like 30 for fastening devices (not shown) for the filter cartridges.

Device 21 according to the invention certainly is very simple, but it is so ingenious, that it is quite possible to use a sealing sheet, which is not very shape resistant, because the resilience of seal 6 and its continuous exposure to the pressure difference means, that possible minor surface irregularities would be filled up and bridged over, no leakage streams arising. It is also reasonable to maintain, that sealing sheet 21 is made even more shape resistant due to the edge fastening on all sides in an assembly or duct joint If it is required, it is of course possible to provide said edge area with special fastening means, e.g. a certain profiling, which will counteract a bending of the sheet or every tendency to be drawn into the assembly or the duct. It is also possible to combine said fastening means with outer, not shown tightening means in order to press together two adjacent panels 10 within each joint area.

It is a substantial advantage, that plane sheets, to be used as blanks for sealing sheets, are easily available everywhere and easily can be provided with e.g. punched openings 9 having the required size and location. Consequently, filter cartridges and possibly cassettes can be purchased from a certain supplier, whereas the sealing sheet can be delivered from another supplier or manufactured directly on the air treatment apparatus. The cassettes are, thanks to the invention, less critical regarding sealing details and their precision, and consequently also the cassettes can be delivered from quite different types of suppliers and/or they can be manufactured from thinner and/or less expensive materials.

It is advantageous to manufacture the cassettes with e.g. through vertical walls for all the cassettes, which are vertically arranged, and with through horizontal outer walls, which is shown in the drawings. In this way additional manufacturing and cost advantages can be obtained.

The invention is not limited to the embodiments, which have been described above and/or shown in the drawings, but it can be supplemented and altered respectively in any arbitrary manner within the scope of the inventive idea and the enclosed claims respectively. Thus, it is not necessary to use cassettes, e.g. when only one filter or one filter cassette is used. Cassettes mainly do not contribute to the sealing efficiency of the apparatus and consequently can be dispensed with in certain cases, but they are of course practical to use and forms supplementary locking and pressure devices 30 and also make the sealing sheet more rigid.

One embodiment of the invention, in which cassettes 4 have been reduced to holders 4', is shown in FIGS. 5 and 6. These holders comprise only a remainder of cassettes, which otherwise are closed all around, within the corner areas and also in these areas additional material savings can be made, e.g. by means of triangular or trapezoidal recesses 31, where the base is formed by or overlaps sealing sheet 21'. Those holder portions, which are disposed within vertical planes in the drawings, can have a rectangular basic shape, whereas the adjacent portions, disposed within horizontal planes, can have a trapezoidal and semi-trapezoidal basic shape respectively. Said holder portions, disposed within vertical planes, can, at their free edges, have openings or the like 30' for said tightening means, which suitably are eccentric elements, disposed on the ends of a tightening rod (not shown), applied across the width of the filter cartridges.

Increased rigidity of the apparatus, despite reduced cassette size and/or thinner sealing sheet, can be obtained by providing the latter, on its air downstream side, with a border (rim) 32 all around, having a width of one or a few centimeters. The border can be obtained by bending the sealing sheet material or by welding or soldering. It extends without interruption along and forms the outer sides of openings 9' and houses beams 33, preferably having the same thickness and which form and define the other opening sides and which are welded to the inner side of the border and to each other within existing crossing points respectively. The cassettes and the holders respectively are welded to the beams to the required extent.

What is claimed is:

1. A filtering apparatus for filtering an air stream comprising one or more filter cartridges provided with one or more filters;

wherein each filter cartridge is fastened to the filtering apparatus and is provided with a seal extending around an axial periphery of each filter cartridge such that the seal axially abuts a surface surrounding an outlet opening defined by each filter cartridge, the surface being oriented radially in relation to the direction of flow of the air stream through the apparatus, and comprising a sealing sheet which, with the exception of the outlet opening, has a continuous radial sealing cross section through the entire filtering apparatus and extends in a radial direction out through at least a portion of an outer wall of the apparatus.

2. The filtering apparatus according to claim 1, wherein each filter cartridge is inserted into a cassette and several cassettes are combined with one another, the several cartridges are joined together to form a single unit having common walls and outer walls, and the common walls extend one of parallel and perpendicular to the outer walls.

3. The filtering apparatus according to claim 1, wherein the sealing sheet is manufactured of a resilient material.

4. The filtering apparatus according to claim 2, wherein the sealing sheet is made of a relatively rigid material and has a relatively large material thickness.

5. The filtering apparatus according to claim 2, wherein the adjacent sides of cassette are fastened, to the sealing sheet, with a surface on the side of the incoming air, which adjacent cassette sides for this purpose at least partially have flanges which are bent at an angle of 90°.

6. The filtering apparatus according to claim 1, wherein the sealing sheet extends outside the apparatus through a joint between adjacent outer wall portions, which joint is sealed by means of seals between the sealing sheet and the outer wall portion joint sides exposed to the sealing sheet.

7. The filtering apparatus according to claim 6, wherein at least one edge of the sealing sheet includes one of an assembly joint and a duct joint.

8. The filtering apparatus according to claim 7, wherein the edge includes holding means to reduce deformation and movement of the sheet.

9. The filtering apparatus according to claim 1, wherein the sealing sheet is made of a separate blank planar sheet provided with punched openings.

10. The filtering apparatus according to claim 2, wherein the cassettes include, for all the cassettes, open vertical walls and open horizontal outer walls.

11. The filtering apparatus according to claim 2, wherein the cassettes comprise a plurality of corner holders, the holders including:
   a) a plurality of substantially rectangular, vertical holder portions;
   b) a plurality of trapezoidal or semi-trapezoidal, horizontal holder portions;
   c) a triangular or trapezoidal recess in a base region of each of the vertical and horizontal holder portions, which base region overlaps the sealing sheet;
   d) fastening means disposed at a distal free edges of the vertical holder portions, for fastening a filter cartridge to the cassette.

12. The filtering apparatus according to claim 2, wherein the sealing sheet includes, on the air downstream side, a continuous border wherein the border is formed by one of a bend, a weld or a soldering in the sealing sheet, such that the border extends through and forms the outer sides of the openings, having the same thickness and which form and define the other opening sides and which are welded to the inner side of the border and to each other respectively within existing crossing points and in that the cassettes and the holders respectively to the existing extent are welded to the beams.

13. An air filtering apparatus comprising:
   a) an air outlet having a peripheral region;
   b) a sealing sheet continuously surrounding the peripheral region of the air outlet, which with the exception of the air outlet, has a continuous radial sealing cross section through the entire air treatment apparatus and extends in a radial direction out through at least a portion of an outer wall of the air treatment apparatus;
   c) a filter cartridge having a downstream side oriented within the air filtering apparatus such that air filtered through the filter cartridge passes out the downstream side of the filter cartridge and through the air outlet; and
   d) a seal extending continuously around an axial periphery of the downstream side of the filter cartridge, the seal adapted to sealingly and continuously contact the sealing sheet.

14. The air filtering apparatus according to claim 13, further including a filter housed within the filter cartridge.

15. The air filtering apparatus according to claim 13, comprising a plurality of filter cartridges and air outlets.

16. The air filtering apparatus according to claim 13, wherein the sealing sheet extends to the atmosphere outside the apparatus through a joint between adjacent outer wall portions, which joint is sealed by means of seals between the sealing sheet and the outer wall portion joint sides exposed to the sealing sheet.

17. The air filtering apparatus according to claim 13, wherein the sealing sheet is made of a separate blank planar sheet with punched openings.

18. In an air filtering apparatus having an air outlet with a peripheral region, a filter cartridge having a downstream side oriented within the air filtering apparatus such that air filtered through the filter cartridge passes out the downstream side of the filter cartridge and through the air outlet, and a seal extending continuously around an axial periphery of the downstream side of the filter cartridge, the seal adapted to sealingly and continuously contact an interior surface of the peripheral region of the outlet opening, the improvement comprising:
   a sealing sheet continuously surrounding the peripheral region of the air outlet, which with the exception of the air outlet, has a continuous radial sealing cross section through the entire air treatment apparatus, and the sealing sheet extends in a radial direction out through at least a portion of an outer wall of the air treatment apparatus.

19. The air filtering apparatus according to claim 18, wherein the sealing sheet is made of a separate blank planar sheet with punched openings.

* * * * *